(12) United States Patent
Nash et al.

(10) Patent No.: US 12,298,142 B1
(45) Date of Patent: May 13, 2025

(54) SYSTEM AND METHOD FOR BROADCASTING NAVIGATION INSTRUCTIONS

(71) Applicant: UIPCO, LLC, San Antonio, TX (US)

(72) Inventors: Justin Royell Nash, Little Elm, TX (US); Huihui Wu, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 200 days.

(21) Appl. No.: 18/068,065

(22) Filed: Dec. 19, 2022

Related U.S. Application Data (60) Provisional application No. 63/292,042, filed on Dec. 21, 2021.

(51) Int. Cl.
| | | |
|---|---|---|
| *G01C 21/34* | (2006.01) | |
| *G01C 21/36* | (2006.01) | |
| *G08G 1/01* | (2006.01) | |
| *G08G 1/09* | (2006.01) | |

(52) U.S. Cl.
CPC ..... *G01C 21/3415* (2013.01); *G01C 21/3461* (2013.01); *G01C 21/3661* (2013.01); *G01C 21/3694* (2013.01); *G08G 1/0112* (2013.01); *G08G 1/0116* (2013.01); *G08G 1/0133* (2013.01); *G08G 1/091* (2013.01)

(58) Field of Classification Search
CPC ............ G01C 21/3415; G01C 21/3461; G01C 21/3661; G01C 21/3694; G08G 1/0112; G08G 1/0116; G08G 1/0133; G08G 1/091

USPC ......................................................... 701/415
See application file for complete search history.

(56) References Cited

U.S. PATENT DOCUMENTS

| | | | |
|---|---|---|---|
| 2014/0232564 A1* | 8/2014 | Garay ................. | G08G 1/0116 340/934 |
| 2015/0066345 A1* | 3/2015 | Cheatham, III ....... | G08G 1/166 701/301 |
| 2017/0371608 A1* | 12/2017 | Wasserman ............ | G07C 5/008 |
| 2018/0040246 A1* | 2/2018 | Yonemura ............. | H04W 4/027 |
| 2019/0051156 A1* | 2/2019 | Banvait ............ | G08G 1/096791 |
| 2019/0086224 A1* | 3/2019 | Sharma ................ | G08G 1/0125 |
| 2020/0105131 A1* | 4/2020 | Carter ................. | G08G 1/0133 |
| 2020/0126415 A1* | 4/2020 | Lin ................. | G08G 1/096741 |
| 2020/0365015 A1* | 11/2020 | Nguyen ............... | G08G 1/0129 |
| 2021/0263166 A1* | 8/2021 | Zheng ............. | G08G 1/096783 |
| 2023/0110089 A1* | 4/2023 | Ogata ................. | G08G 1/0133 701/118 |

* cited by examiner

*Primary Examiner* — Tyler D Paige
(74) *Attorney, Agent, or Firm* — Plumsea Law Group, LLC (57) ABSTRACT

A method and system for managing roadside information and distributing navigation information is disclosed. The embodiments provide a roadside device network configured to collect sensor data and vehicle-originated data about the local roadway. The roadside devices are spaced along the road and are connected to a central server to collect information about the impaired road condition, determine an approximate location of an impaired road condition, calculate an alternate route, and transmit an alternate route to a roadside device to transfer the information to a passing vehicle.

20 Claims, 8 Drawing Sheets

SYSTEM AND METHOD FOR BROADCASTING NAVIGATION INSTRUCTIONS

CROSS-REFERENCE TO RELATED APPLICATION

This application claims the benefit of U.S. Provisional Patent Application Ser. No. 63/292,042 filed on Dec. 21, 2021 and titled "System and Method for Broadcasting Navigation Instructions", the disclosure of which is incorporated by reference herein in its entirety.

TECHNICAL FIELD

The present disclosure generally relates to a network of roadside navigational instruction devices, and in particular to wireless networking systems and methods for transmitting navigational instructions to a vehicle traveling along a roadway.

BACKGROUND

All types of vehicles travel along roadways throughout the USA and international, from private vehicles to commercial trucks. Many vehicles have a GPS system integrated into the control screen on the dashboard of the vehicle that provides a map of the area and even indications along the roadway if traffic is flowing smoothly or backed up due to an accident. This GPS mapping system is also available on a cell phone. Traffic data from these GPS systems may not be sufficiently current and/or precise enough to route a vehicle around a problem area, especially if there is not sufficient reporting provided by on-the-screen drivers. For example, an accident might have just happened ahead so the first vehicles to come to the accident scene would be the first vehicles to show a slowing down or even a complete stop on these GPS systems. Several vehicles would have to show up on the GPS system before the GPS system would indicate a roadway problem to other drivers approaching the accident scene. The first group of vehicles would not be able to take advantage of the early warning about the accident and make alternate plans to bypass the accident scene.

A road sign along a highway can display a message to vehicles about an incident ahead such as the roadway being closed and indicate an alternate route to travel on to bypass the closed road. The message on a sign of this type would come from a central authority associated with the roadway. The central authority would eventually be informed of the incident, perhaps by a police officer called to the scene, and in response change the message on the roadway sign. However, the updated message is usually presented after many passing vehicles have already moved into the incident area.

There is a need in the art for a system and method that addresses the shortcomings discussed above.

SUMMARY

In one aspect, a computer-implemented method of distributing navigation information is disclosed. A first step includes receiving, at a server, information from a plurality of roadside devices, and a second step includes determining, at the server, there is a high likelihood of an impaired road condition based on the information. A third step includes identifying, at the server, an approximate location of the impaired road condition, and a fourth step includes calculating, at the server and based on the approximate location of the impaired road condition, an alternative driving route around the approximate location of the impaired road condition. In addition, a fifth step includes retrieving, at the server, location information of the plurality of roadside devices, and a sixth step includes selecting, at the server, a beacon roadside device among the plurality of roadside devices by comparing the alternative route with the location information of the plurality of roadside devices. Furthermore, a seventh step includes transmitting, from the server and to the beacon roadside device, route guidance information corresponding to the alternative route and instructions for the beacon roadside device to broadcast the route guidance information corresponding to the alternative route.

In another aspect, a computer-implemented method of distributing navigation information includes a first step of receiving, at a server, information from a plurality of roadside devices including a first roadside device, and a second step of determining, at the server, there is a high likelihood of an impaired road condition based on information received from the first roadside device. In such cases, the information received from the first roadside device includes vehicle information received from a first vehicle traveling near the first roadside device. The method also includes a third step of transmitting, from the server and to a second roadside device, route guidance information corresponding to a calculated alternative route, the second roadside device being different than the first roadside device and the second roadside device being spaced apart from the first roadside device, and a fourth step of transmitting, from the server and to the second roadside device, instructions to broadcast the route guidance information corresponding to the calculated alternative route.

In another aspect, a system for distributing navigation information includes a processor and machine-readable media including instructions which, when executed by the processor, cause the processor to receive, at a server, information from a plurality of roadside devices, and to determine, at the server, there is a high likelihood of an impaired road condition based on the information. The instructions further cause the processor to identify, at the server, an approximate location of the impaired road condition, and to calculate, at the server and based on the approximate location of the impaired road condition, an alternative driving route around the approximate location of the impaired road condition. In addition, the instructions cause the processor to retrieve, at the server, location information of the plurality of roadside devices, and to select, at the server, a beacon roadside device among the plurality of roadside devices by comparing the alternative route with the location information of the plurality of roadside devices. Furthermore, the instructions cause the processor to transmit, from the server and to the beacon roadside device, route guidance information corresponding to the alternative route and instructions for the beacon roadside device to broadcast the route guidance information corresponding to the alternative route.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The proposed embodiments describe a system and method for vehicle navigation and guidance using a plurality of on-site roadside devices. The roadside devices each collect sensor data about their local environment and an onboard computing device will transmit the sensor data wirelessly to a data hub. The hub can pass information to other roadside devices in its meshed network, and/or transmit the information to a remote central server. The remote server is configured to monitor and manage the flow of information obtained from the roadside devices and convey relevant information relevant back to vehicles traveling along particular area or stretch of the roadway. In some embodiments, the information can offer near-real-time status reports of the condition of the roadway ahead, including obstacles, traffic incidents, and/or other road conditions that can potentially affect the drivers' passage. In one example, the information can further include navigation instructions to re-route vehicles and help to more immediately avoid an incident that has been detected upstream of the vehicles. The system leverages its network and information about the location of each roadside device to guide drivers and offer advice directly applicable to their current location.

Figure 1:
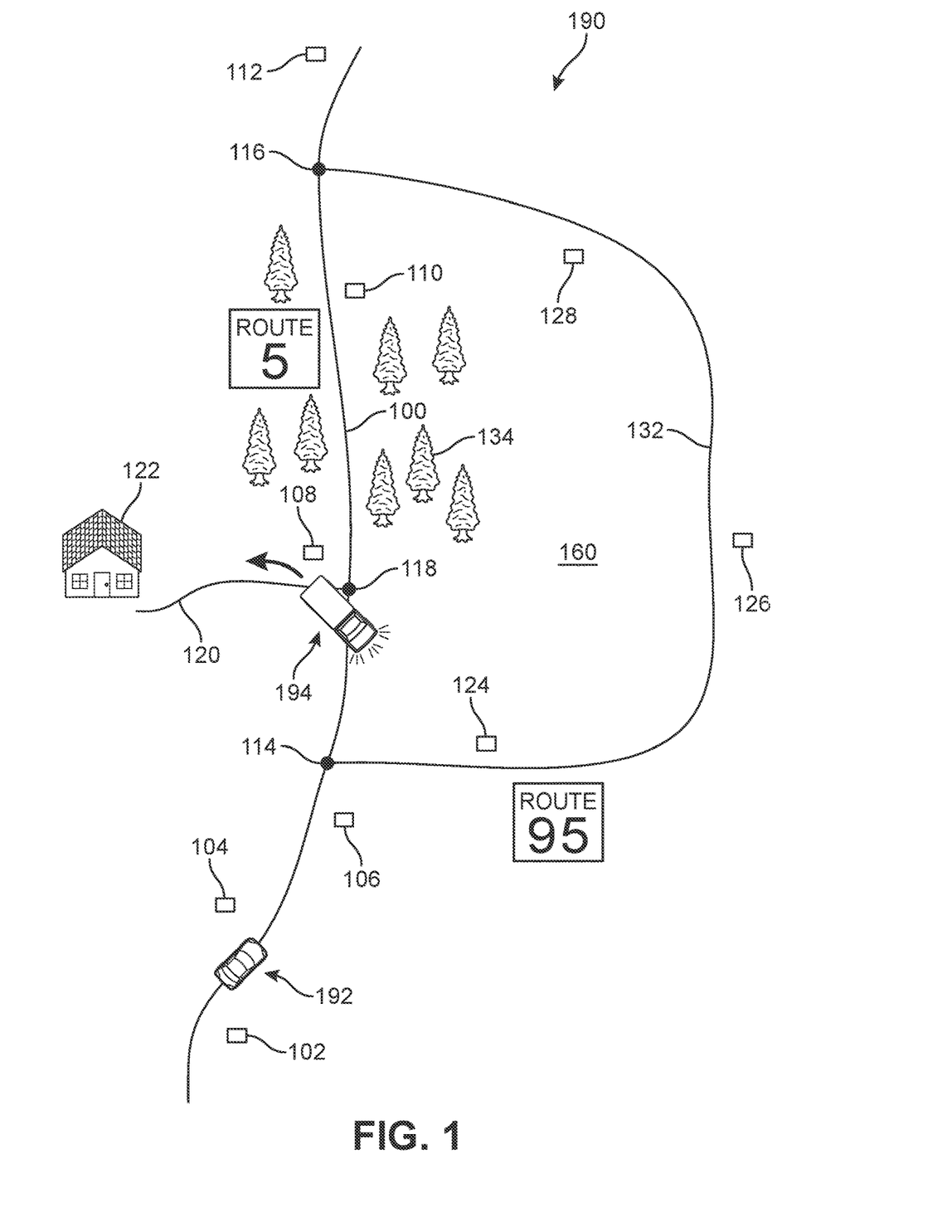
FIG. 1 is a schematic bird's eye view of a section of a roadway employing a roadside device network in which a truck obstructs part of the road, according to an embodiment.

For purposes of introduction, an overview of one embodiment of the proposed systems and methods is illustrated with reference to FIG. 1. FIG. 1 depicts a schematic birds-eye view of a first roadway region 190 which includes a main road 100 (e.g., "Route 5"), and a bypass road 132 (e.g., "Route 95"). The two roads can be seen to intersect at a first intersection 114 and a second intersection 116. The bypass road 132 branches away from the main road 100 (at the first intersection 114) to loop around a first zone 160 including a forested area 134, until rejoining the main road 100 at the second intersection 116. A driveway 120 extending from the main road 100 to a building 122 (e.g., a residence or a business) is also shown extending from a third intersection 118 with main road 100.

In different embodiments, as will be described in greater detail below, a plurality of roadside devices (or simply "devices")—here shown as a first device 102, second device 104, third device 106, fourth device 108, fifth device 110, sixth device 112, seventh device 124, eighth device 126, and ninth device 128—can be stationed at intervals along a road, each device being configured to communicate wireless to passing vehicles. In other examples, the number of roadside devices along a road and the space between two roadside devices can vary. In FIG. 1, the roadside devices including first device 102, second device 104, third device 106, fourth device 108, fifth device 110, sixth device 112 are arranged at intervals along the main road 100, and roadside devices including seventh device 124, eighth device 126, and ninth device 128 are arranged at intervals along the bypass road 132.

In FIG. 1, a large truck 194 has reversed and is currently turning to back up onto the driveway 120 toward the building 122, for example to perform a service with respect to building 122. However, it can be appreciated that the process of moving the truck 194 can cause an obstruction along the main road 100 (hereby referred to as a first incident), leading to congestion and/or wait times for vehicles traveling on the main road 100. In some embodiments, the proposed system is configured to obtain sensor data around the first incident, for example via sensors for fourth device 108, which is stationed near the third intersection 118.

In different embodiments, the system is configured to receive information from the plurality of roadside devices, including the fourth device 108. For example, a data hub and/or remote server (e.g., see FIG. 3) may receive the sensor data from the fourth device 108 and determine there is an impaired road condition at or around the fourth device 108. It can be understood that each roadside device will be associated with a unique identifier, which the central server can use to immediately identify the location of each roadside device. In one embodiment, the central server can use this location data as well as the collected sensor data to also determine an approximate location of the impaired road condition. Furthermore, in some embodiments, based on the approximate location of the impaired road condition, the central server can calculate an alternative driving route around the approximate location of the impaired road condition (i.e., a detour).

In addition, the central server can be configured to identify the roadside devices that are in a particular range of the fourth device 108. Thus, in one embodiment, the alternate driving route can be selected based on sensor data collected by such 'nearby' roadside devices arranged along the alternate roadways to identify the path that is most likely to provide for an optimal (low traffic, minimal obstacles) transit of the vehicle. The central server can then select a roadside device disposed "upstream" of the alternative route, and transmit the new route guidance information (corresponding to the alternative route) to the selected roadside device, along with instructions for the selected roadside device to broadcast the route guidance information corresponding to the alternative route. The term upstream should be understood to refer to the relative location of a roadside device as a vehicle approaches. The vehicle is traveling downstream (toward the impaired road condition and/or the turn off for the alternate route), and the beacon devices are disposed upstream relative to the impaired road condition and/or turn off for the alternate route. Thus, the vehicle—if it maintains its expected path—will arrive at (or pass) these roadside beacons before reaching the impaired road condition and/or the turn off for the alternate route.

In this example, upstream devices relative to the third intersection 118 and an approaching first vehicle 192 include first device 102, second device 104, and third device 106. As the first vehicle 192 moves north along the main road 100 and passes the first device 102, the first device 102 detects the first vehicle 102, and the system determines the first vehicle 102 is moving north on the main road 100, potentially toward third intersection 118. In some embodiments, the system causes the second device 104 and/or the third device 106 to broadcast a message to the passing first vehicle 192, the message alerting the driver of the upcoming obstruction and/or presenting alternate route guidance information. In other words, although the first incident involving the truck 194 has occurred only seconds to minutes before, the driver of the first vehicle 192—which is very soon approaching the location of the truck 194—is able to make a swift adjustment and avoid the first incident altogether by driving instead along the bypass road 132. Such near-real-time messaging can be of particular benefit on roadways where traffic and road conditions are frequently in flux from one minute to the next.

Figure 2:
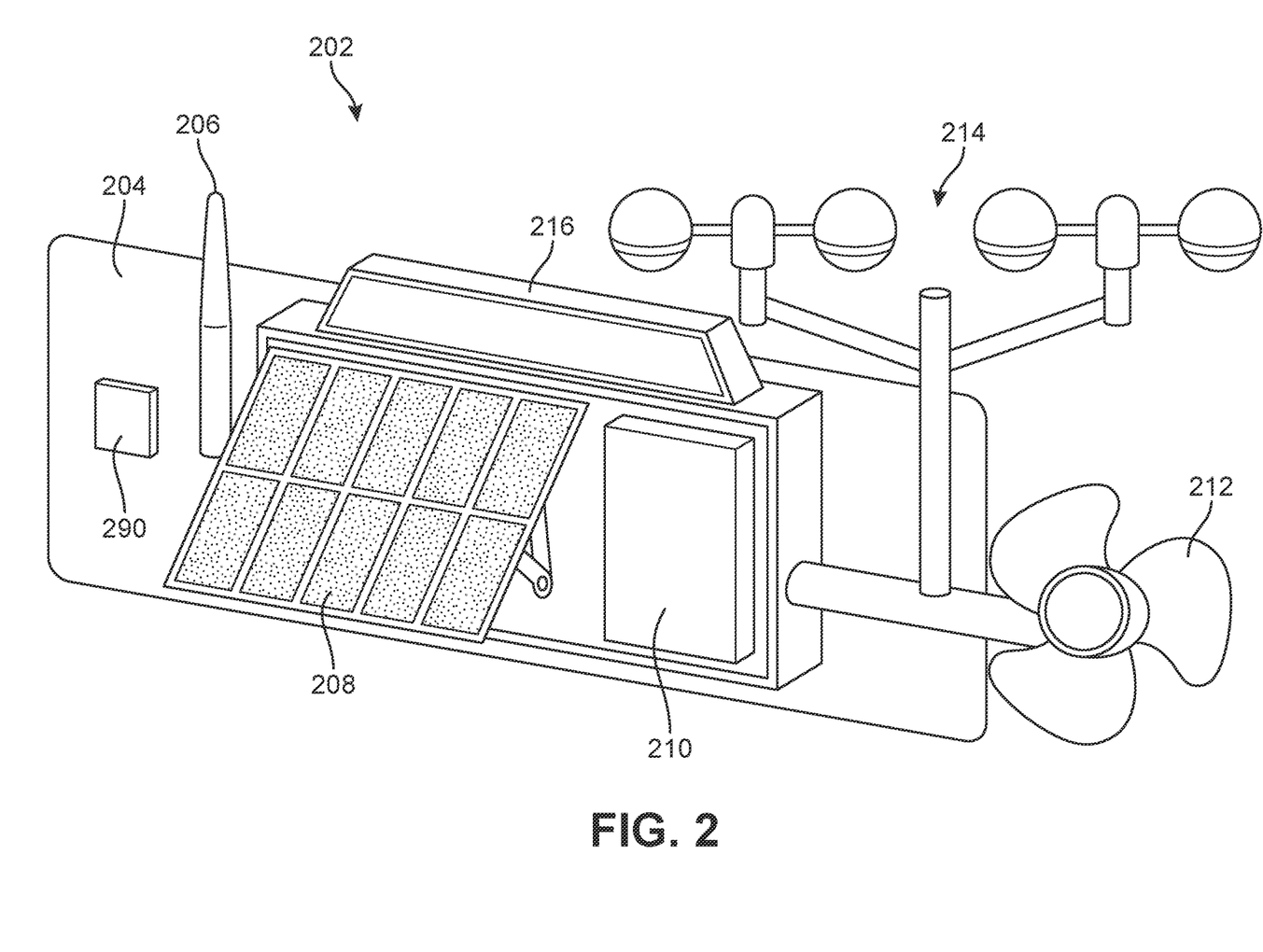
FIG. 2 is a schematic view of a roadside device secured to a mile marker, according to an embodiment.

Referring now to FIG. 2, one example of a roadside device 202 is provided. It should be understood that the depicted device is only an example, and the described components and functionality of said device can be provided in a different configuration than the one shown in FIG. 2. In different embodiments, the roadside device 202 can be installed along the side of a road, or above the road (i.e., on a post extending across and over the road). The roadside device 202 can be self-supporting or can be attached to an already existing structure. In an embodiment, the structure can be a mile marker sign 204. In another embodiment, the structure can be a post, bridge, tree, wall, billboard, or other object near the road.

The hardware assembly of the device can optionally include user control components (e.g., a power on/off switch, range adjustment, mode selector, charging indicator light, etc.) and/or one or more sensor(s). In addition, the roadside device 202 can include provisions for powering the device components, as well as enabling communication between the device and a hub and/or central server. In some embodiments, power source 210 is a rechargeable battery, which may be recharged by a charger cable connected to the local electric supply, wirelessly, or a solar powered battery that can be charged by solar cells. In one embodiment, the device 202 includes one or more solar panel(s) 208 distributed across an external surface of the device, and is connected to power source 210 for charging. However, various other embodiments also contemplate alternate or additional independent power supplies including, but not limited to: batteries and re-chargeable power sources (e.g., energy harvesting sensors/batteries), kinetic energy mini-generator devices, vibration harvesting devices, or a wind turbine 212, and the like. In some embodiments, the hardware assembly of the roadside device can be completely self-contained, locally including the necessary software to work without a network (internet) connection. In one example, the solar panel 208 can be used to charge the battery 210 when the sun is shining, and the wind turbine 212 can be used to charge the battery at night where there is a breeze.

In different embodiments, the roadside device 202 also includes an image sensor 216, such as a camera. The camera can be a still camera or a video camera. In some embodiments, the camera can be used to identify information about a vehicle (e.g., heading, speed, license plate number, vehicle type, etc.) or about a road condition (e.g., road obstacles, traffic patterns, dangerous conditions, etc.). In one embodiment, the roadside device 202 includes a weather detection system 214 which can include one or more of a barometer, a temperature gauge, a thermal detector, an air quality gauge, a humidity gauge, a wind speed detector, and a UV detector. Furthermore, roadside device 202 can include a device to transmit and receive information, such as a radio signal receiver and transmitter 206. The radio signal receiver and transmitter can transmit radio signal information to a vehicle in proximity to the roadside device 202, as well as to the data hub and/or remote server.

In some embodiments, roadside devices can include one or more sensors such as infrared detection sensors. Infrared detection refers to the use of heat sensing equipment, also known as infrared (IR) scanners, cameras, imaging devices, or sensors, for detection of heat sources that may not be visually observable or otherwise detectable by a person. As a general matter, an infrared sensor may be configured to detect infrared radiation (e.g., infrared energy) from a target scene including, for example, mid-wave infrared wave bands (MWIR), long-wave infrared wave bands (LWIR), and/or other thermal imaging bands as may be desired in particular implementations. Other sensors can include smoke/fire/heat sensors, carbon monoxide/dioxide sensors, ambient light sensors, temperature sensors, humidity sensors, and the like, each of which may be configured to send messages to the other devices and/or a data hub or remote server.

In another embodiment, the roadside device 202 can incorporate one or more internet of things (IoT) device(s) ("smart sensors"). Smart sensors could comprise any of a variety of different IoT devices, such as one or more of a pressure sensor, chemical sensor (for detecting smoke, carbon monoxide or other chemical compositions), temperature sensor, magnetometer, smoke/flame detectors, moisture sensor, electrostatic sensor, volume/sound sensors, light sensors, aerosol characterization sensors, and other smart devices that may include one or more sensors. Supplemental data from smart sensors can be received by the remote server and used to determine areas of concern with more precision.

In other cases, a sensor may include a microphone that can collect data to determine whether specific sounds present on or around the nearby roadway indicate an emergency situation, or correspond to sounds that are anomalous to the environment and may represent danger. For purposes of this application, the term ambient noise information is the sound profile collected for a particular location or space during normal, day-to-day use of such space. In some embodiments, current sound information is received by a sensor or other smart device, which identifies whether there is a variation in sound between the current sound information and the ambient noise information. The ambient noise information is subtracted from the current sound information if the variation has been identified, to identify a sound anomaly. The smart device extracts a sound anomaly signal and sends it to a database, where the sound anomaly signal is compared to predetermined anomaly signals stored in a database where the predetermined anomaly signals are associated with diagnostic information.

In addition, each roadside device can include provisions for communicating with, and processing information from, the remote server. Thus, the roadside device 202 include one or more processors and memory 290. Memory may comprise a non-transitory computer readable medium. Instructions stored within memory may be executed by the one or more processors. In addition, as noted above, each device may include a communication system such as a radio or other provisions for communicating using one or more communication methods. For example, each communication system could include a Wi-Fi radio, a Bluetooth radio, and/or a cellular network radio.

Figure 3:
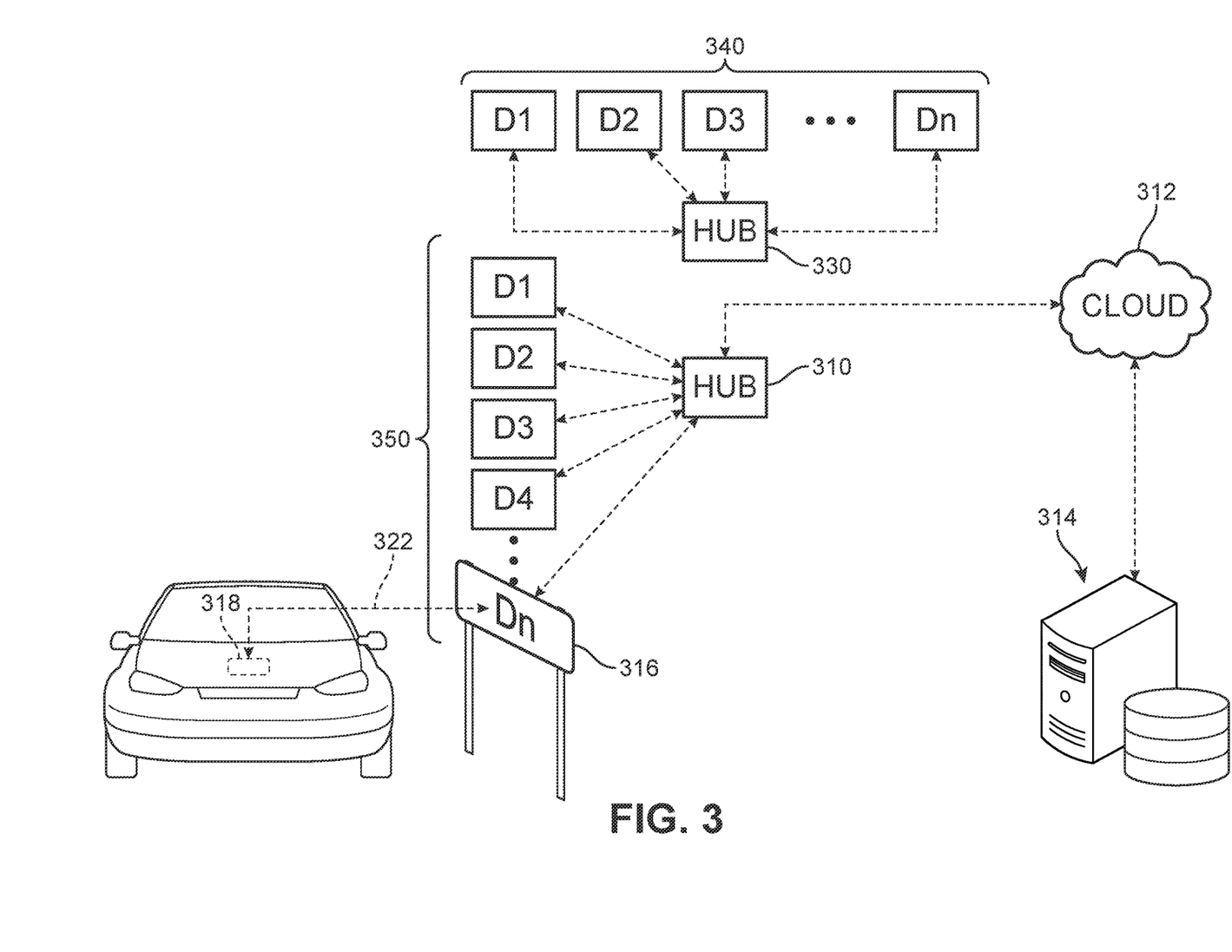
FIG. 3 is a schematic diagram depicting an architecture of a roadside device system; according to an embodiment.

In order to provide the reader with greater context, FIG. 3 presents a schematic diagram illustrating an embodiment of an architecture of a system employing a roadside device network 300. As shown in FIG. 3, a first roadside device set 350 communicates with a remote server 314 (e.g., residing in cloud 312) via a first hub 310, and a second roadside device set 340 communicates with the remote server 314 via a different, second hub 330. For purposes of reference, each device set is represented schematically by a series of boxes labeled D1, D2, D3, D4 . . . . Dn. The number of roadside devices in each roadside device set can vary from one to over a hundred roadside devices. The roadside devices, data hubs, and server can be understood to function as a mesh network in some embodiments, where data is relayed between nodes.

The number of roadside devices that can be connected to a single data hub can depend on several variables. One variable can be a maximum distance that a roadside device can communicate to a data hub using a wireless connection. Another variable could be in the section of roadway. For a long and straight roadway with no exit for many miles, fewer roadside devices would be needed. For a section of roadway passing along a more congested area or with several exits close by, more roadside devices at closer spacing could be used. The number of devices assigned to a single hub can also vary based on the spacing between devices and the strength of the hub signal. Thus, devices must be within a specific range of a hub in order to be managed by said data hub. In other words, the number of devices in one area (e.g., a rural road) and assigned to one hub may be less than the number of devices along a different area (e.g., a highway) that are assigned to another hub. Simply for purposes of this example, there can be twenty roadside devices in the first roadside device set 350 (n=20) and twelve roadside devices in the second roadside device set 340 (n=12).

In FIG. 3, the first roadside device set 350 includes a mile marker roadside device 316 (Dn). As a second vehicle 320 passes near the mile marker roadside device 316, information can be transmitted over a network 322 from the mile marker roadside device 316 to an onboard computing system 318 of the second vehicle 320, for example via a transmitter/receiver associated with the onboard computing device 318, or broadcast to a radio of the second vehicle 320. Similarly, information about the second vehicle 320 collected via roadside device sensors can be shared with first hub 310, such as vehicle type, speed, heading, etc.

In different embodiments, a vehicle's onboard computing system may comprise a single computing device, or a network of multiple computing devices. Onboard computing systems could be associated with one or more electronic control units (ECUs). In one example, onboard computing system 110 includes one or more processors and memory, where memory may comprise a non-transitory computer readable medium and instructions stored within memory may be executed by the one or more processors. The second vehicle 320 may also include one or more communication components. Communication components may include cellular network components for communicating over cellular networks, radio components for communicating over radio waves, Wi-Fi components for communicating over Wi-Fi networks, and other communication components. The second vehicle 320 may also include a navigation system. For example, navigation system can include a GPS receiver that can receive GPS information. In other cases, navigation system can include other receivers capable of receiving global or local positioning information. Additionally, navigation system may comprise maps and/or information from other kinds of geographic information systems (GIS) that can be used to generate navigation routes for a driver. A vehicle may also include one or more vehicle sensors that can be configured to share data with nearby roadside devices, such as cameras that can produce image data, motion sensors that can relate to traffic patterns, infrared sensors that can be used in darkened conditions, distance sensors/rangefinders, etc. In addition, as will be discussed with reference to FIG. 8, a vehicle can further include a driver alert system that can be configured to work in cooperation with the roadside device network. A driver alert system may be configured to transmit and/or receive external road conditions around the vehicle for presentation to occupants of the vehicle.

As shown in FIG. 3, the roadside devices are wirelessly connected to their respective data hubs. Each data hub (310, 330) can transmit and receive information between a plurality of roadside devices and the central remote server 314. Each data hub 310 can be powered by a source of renewable energy, as discussed with respect to the roadside device 202 of FIG. 2.

In different embodiments, information related to a road condition can be communicated to the remote server 314 from one or more of the roadside devices through its assigned data hub. Thus, a device in the first roadside device set 350 communicates through first hub 310 to the remote server 314. The remote server 314 can then communicate to one or more roadside devices—in any roadside device set—with information about a road condition. In other words, information obtained from a device assigned to first hub 310 can be employed for the benefit of drivers passing devices in a different area assigned to second hub 330.

In different embodiments, the remote server 314 can collect information that can be used by a passing vehicle, evaluate the collected information, and transmit results to the roadside devices for sharing with a passing vehicle. As shown in FIG. 3, the remote server can receive information from a plurality of roadside devices. In one embodiment, the remote server can determine an impaired road condition by analyzing information received from a roadside device. The remote server can then determine whether an impaired road condition is present in a particular area. For purposes of this application, an impaired road condition can refer to a closed section of a road, an obstacle in the road, road construction, police or paramedic presence, traffic incidents, road damage, and weather limitations (e.g., fog, heavy rain, heavy snow, or other factors that can affect visibility or traction).

In one embodiment, the remote server can determine an approximate location of the impaired road condition from the one or more roadside devices. The remote server can further calculate an alternate driving route around the approximate location of the impaired road condition. In some embodiments, the remote server can determine which of the roadside devices to select as a "beaconing" roadside device and transmit route guidance information of the location of the impaired road condition and an alternate driving route to the selected device. The beaconing roadside device can correspond to a device upstream from an entrance to the alternate driving route, giving a driver of a vehicle enough time to act on the information. One or more beaconing roadside devices can be selected to transmit route guidance information to a passing vehicle with respect to a particular impaired road condition.

In another embodiment, the vehicle itself can communicate road conditions to the roadside device network. For example, vehicle information can include photographic information with at least one image depicting an impaired road condition. The central server can determine an impaired road condition from the photographic information. In another embodiment, the vehicle information can include navigation information related to a position and a driving direction of a vehicle traveling near the first roadside device. The navigation information can include a change in driving direction of the vehicle. The change in driving direction can indicate a U-turn by the vehicle traveling near to the first roadside device. The central server can collect and analyze the navigation information from the vehicle and determine that an impaired road condition is present based on the U-turn (and other data) and calculate an alternative route. The alternative route can then be transmitted to the vehicle through one or more of the roadside devices to offer to the vehicle driver an alternate route to bypass the impaired road condition.

The remote server 314 includes processors and memory, and can include knowledge repositories and databases, and/or access thereto. The database system may store various kinds of information, including, but not limited to: navigation information, geospatial information, road conditions (for example, real-time traffic patterns taken from aerial monitoring systems), weather information (including, for example, rain, snow, ice and/or flooding forecasts), as well as other kinds of information. It may be appreciated that the remote server 314 may both send and receive information to and from external databases.

Figure 4:
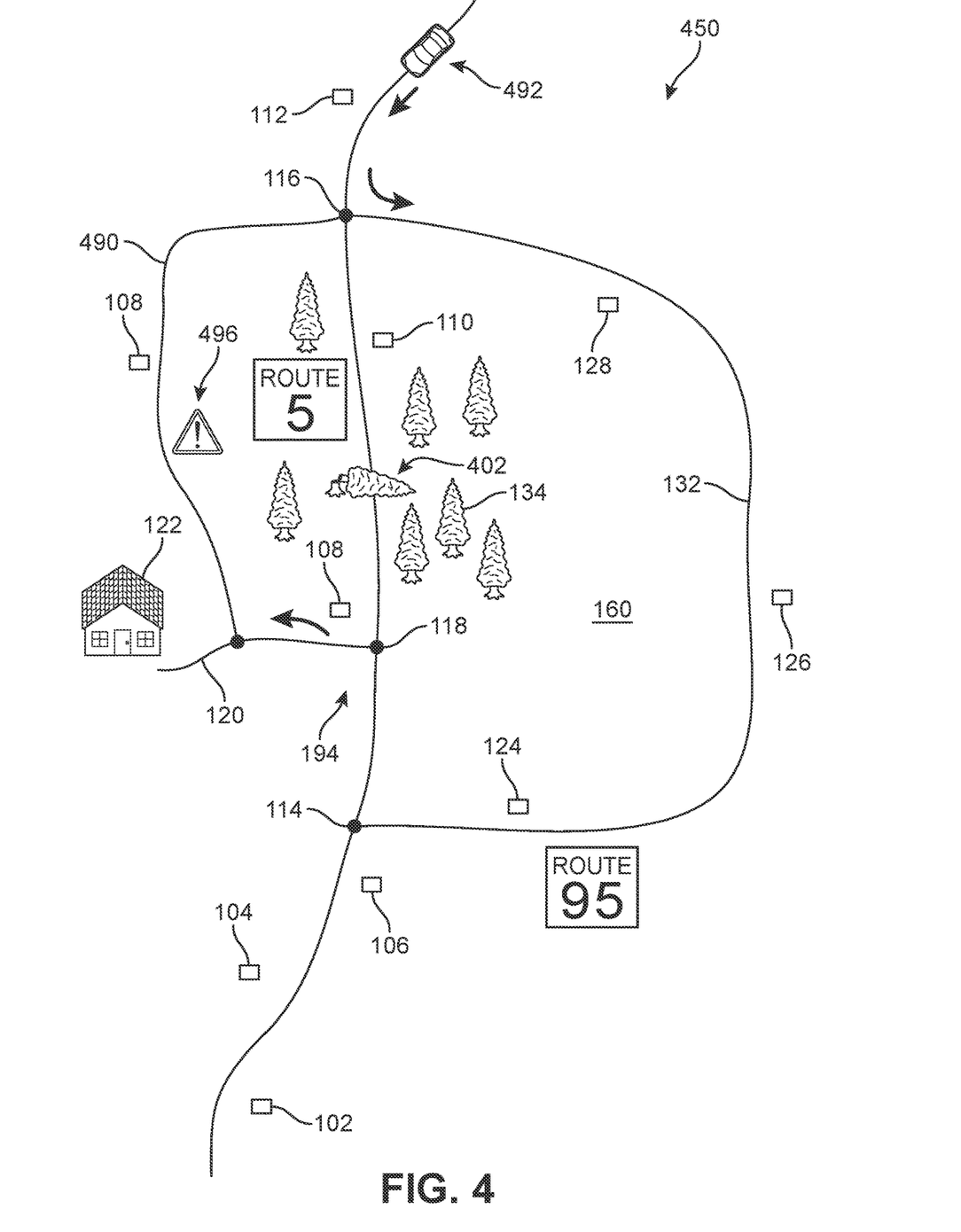
FIG. 4 is a schematic bird's eye view of a section of a roadway employing a roadside device network in which a tree has fallen, according to an embodiment.

Referring now to FIG. 4, a schematic birds-eye view of a second roadway region 450 is shown which is similar to the first roadway region 190 of FIG. 1. The second roadway region 450 includes main road 100 and bypass road 132. However, an additional interior road 490 is also depicted, such that driveway 120 extends or branches from the interior road 490, rather than the main road 100. The interior road 490 begins at the main road 100 at the third intersection 118 and loops around a forest area to the west until rejoining the main road 100 at the second intersection 116.

In FIG. 4, a portion of the main road 100 has become obstructed due to an impaired road condition, such as a fallen tree 402. Thus, a section of the main road 100 between first intersection 114 and second intersection 116 is blocked for thru traffic. In different embodiments, data collected via fourth device and/or fifth device 110 can be conveyed to the remote server. The system can then determine that a section of the road is closed and communicate this information to one or more of the roadside devices that are stationed in a location that would allow sufficient time for the driver to take an alternate route and/or to devices that are within a particular range of the obstruction. In this example, a third vehicle 492 is traveling south down the main road 100. The system causes the sixth device 112 and fifth device 110 to broadcast information pertaining to the fallen tree 402 and traffic issues related to the incident. The third vehicle 492 receives this broadcast in time to make a turn at the second intersection 116. A vehicle that is further along can receive the information from fifth device 110 and choose to make a U-turn to avoid the upcoming obstacle.

It can be appreciated that the third vehicle 492 could at this time take bypass road 132 or interior road 490. In general, it would be understood that the shorter distance of the loop for interior road 490 would be a quicker detour than the larger loop of bypass road 132. However, in this case, construction 496 is occurring on the interior road 490, which being a neighborhood street, is only known to the residents of the road. Thus, the non-resident/non-local driver of third vehicle 492 would not be aware of such construction 496, nor would such small, localized roadwork be monitored by other conventional navigation networks.

In this case, a tenth device 408 collects sensor data and the remote server receives the sensor data and determines there is an obstruction that would lead to a longer drive time than taking the larger bypass loop, based on sensor data received from seventh device 124, eighth device 126, and ninth device 128 along bypass road 132 indicating a relatively uncongested journey. The system then causes the beacon devices (selected here as sixth device 112 and fifth device 110) to broadcast a message describing an incident further down the main road 100 at an 'X' distance away, and then can also recommend that the third vehicle 492 opt to travel along the longer bypass road 132 rather than the shorter interior road 490. In one embodiment, the construction 496 associated with interior road 490 can also be presented to the driver, to allow the driver to decide whether they nevertheless would prefer the interior road 490. For example, if third vehicle 490 is heading to building 122 (which has driveway 120 intersecting with the main road at third intersection 118 which is before the closed road section at fallen tree 402) the driver can reject the suggested bypass road 132 and take interior road 490.

Figure 5:
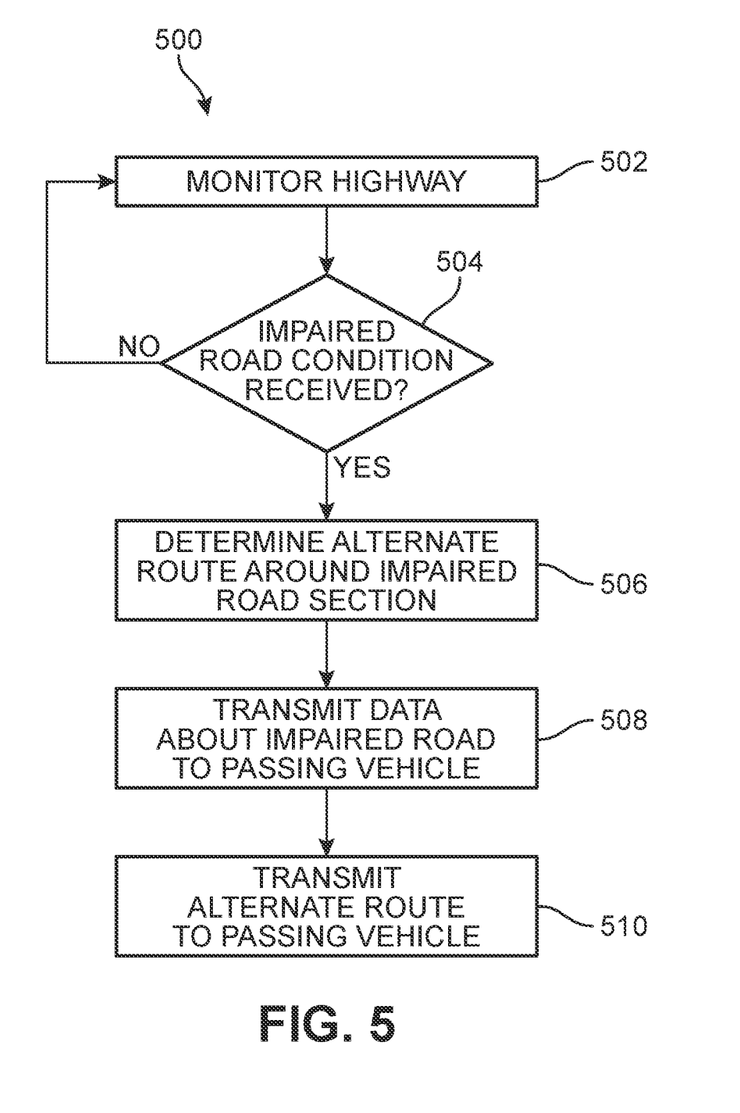
FIG. 5 is a flow diagram depicting a process for transmitting data between a roadside device and a passing vehicle, according to an embodiment.

For purposes of clarity, FIG. 5 presents a flow diagram of an embodiment of a process 500 by which the proposed systems receive and transmit information. In a first stage 502, the system monitors the highway via its network of roadside devices. In a second stage, the system evaluates the incoming sensor data from its device network. If no impaired road condition is indicated, the system continues to monitor the highway. If a impaired road condition is indicated with a high likelihood based on the sensor data, a third stage 506 occurs.

In different embodiments, the sensor data received by the remote server from a particular roadside device and/or data hub can be evaluated by an image recognition system. The image recognition system is configured to identify objects at a distance that are near or on one or more of the roadways (such as animals, people). For example, an object classification paradigm may be applied to a vehicle's data in which potential obstructive objects are detected, and an image recognition model is implemented to best determine the type of object that was detected. Although not shown here, in some embodiments, the image recognition system can access an obstacle determination module configured to assess the relevance of the detected object as an obstacle and determine whether the sensor data for the object ("object snapshot") has a high likelihood of corresponding to an impaired road condition. In another example, an action classification model is used to process patterns of traffic in order to assess whether a particular vehicular action (U-turning, sudden stops, swerving) in a specific area is occurring and to an extent indicating a high likelihood of an obstruction or other impaired road condition. In yet another example, crowdsourced vehicle sensor data from the vehicles traveling in the area is collected and processed to determine whether there is a high likelihood of an impaired road condition. In some embodiments, even in cases where the object type is not recognized by the image recognition system, the system can determine if there is a high likelihood of an impaired road condition that should trigger a message to incoming vehicles. In some embodiments, the models can reside and generate outputs entirely in the computing device for the roadside device, and/or in the data hub, and/or in the remote server.

The third stage 506 involves an optional step in which the system calculates an alternate route around the impaired road section and determines which alternate route of the different alternate routes should be selected as the optimal recommendation (based on sensor data from the roadside devices along those alternate roadways). A fourth stage 508 includes transmitting data about the impaired road via the local roadside devices to vehicles approaching the impaired road condition as the vehicle passes by the roadside device. In an optional fifth stage 510, the selected alternate route (of third stage 506) is transmitted via the local roadside devices to vehicles approaching the impaired road condition as the vehicle passes by the roadside device.

In some embodiments, the information can be displayed on the vehicle's interior display, either as a visual message and/or map. In another example, the onboard computing system can present the information as audio. If the driver selects to receive an alternate route, then the system can transmit the alternate route information to the passing vehicle for the driver to see on the display. In another embodiment, the wireless roadside device can transmit a radio signal to a vehicle with a radio. The radio signal can be broadcast on a certain frequency with the radio in the vehicle set to this frequency. The roadside device can broadcast a voice message to be heard on the radio in the vehicle. The voice message can be to alert a driver to an impaired road condition ahead, and also can speak about an alternate route to bypass the impaired road condition. For example, the radio could broadcast a message indicating "the road is closed 5 miles ahead" and/or "an alternate route can be used by taking the next right turn on route 95".

Figure 6:
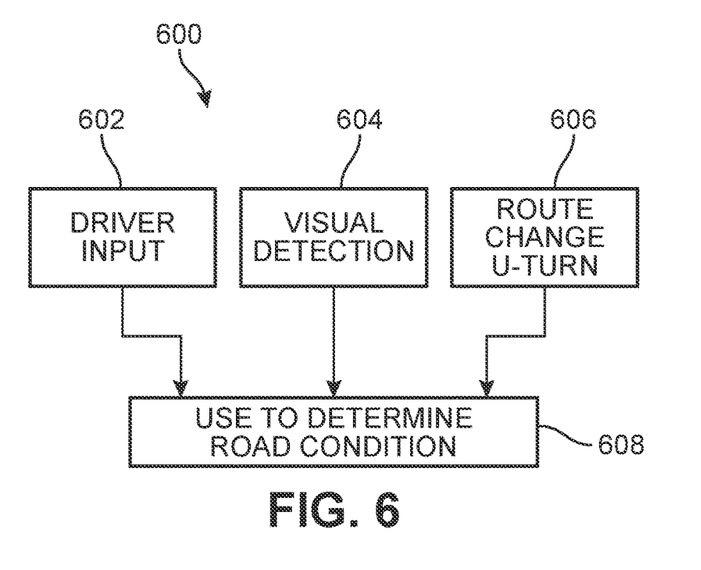
FIG. 6 is a flow diagram depicting three sources of input for the system in determining whether a road impairment is present, according to an embodiment.

FIG. 6 presents a flow diagram 600 illustrating some of the vehicle-based sources that can provide data that can be used by the system to determine whether an impaired road condition 608 has occurred according to an embodiment. A first source 602 includes driver input; for example, a driver of a vehicle can approach a condition in the road such as a fallen tree and select an option via a display of their onboard computing system to indicate a closed road ahead. The vehicle GPS would identify the location of the closed or blocked road and communicate this data to the remote server by a transmission to the nearest roadside device, which will forward the information to the remote server.

A second source 604 includes visual detection; for example, a camera in the vehicle connected to an artificial intelligence software that can "see" and detect object(s) blocking the road. This data will then be transmitted from the vehicle to the nearest roadside device, which will share the information with the remote server. A third source 606 includes monitoring of vehicle behavior. For example, data indicating movement of a vehicle such as a U-turn may be significant as corresponding to an indication that the road at this section is not passable and can be considered closed. The remote server can then pinpoint the location of the closed road section and calculate an alternate route to detour around the closed road section. In addition, the remote server can send route guidance information or data to the local roadside devices for transmission to passing vehicles.

Figure 7:
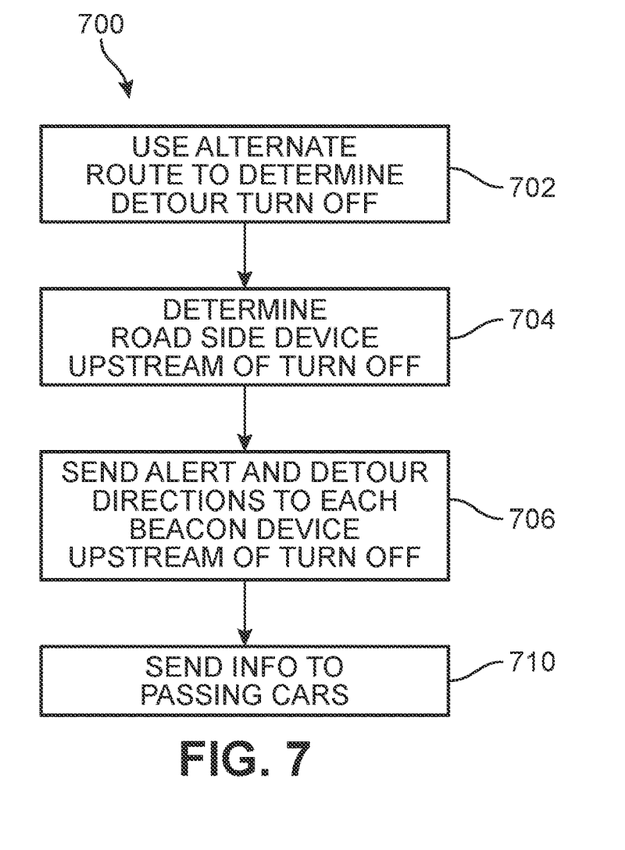
FIG. 7 is a flow diagram depicting a process for selecting which roadside device will receive instructions from the server, according to an embodiment.

FIG. 7 presents a flow diagram depicting an embodiment of a process 700 by which the system selects which roadside devices will communicate a road closed condition to a passing vehicle. In a first stage 702, the selected alternate route (see FIG. 5) is used to determine the location of the initial detour turn-off. In a second stage 704, the system identifies one or more roadside devices (referred to herein as beacon devices) that are stationed upstream of the turn-off (see FIG. 4). In a third stage 706, the system transmits the specific alert content and detour directions to each beacon device that is upstream of the turn-off. Finally, in a fourth stage 708, the beacon device(s) broadcast or otherwise communicate the information to the passing cars.

Figure 8:
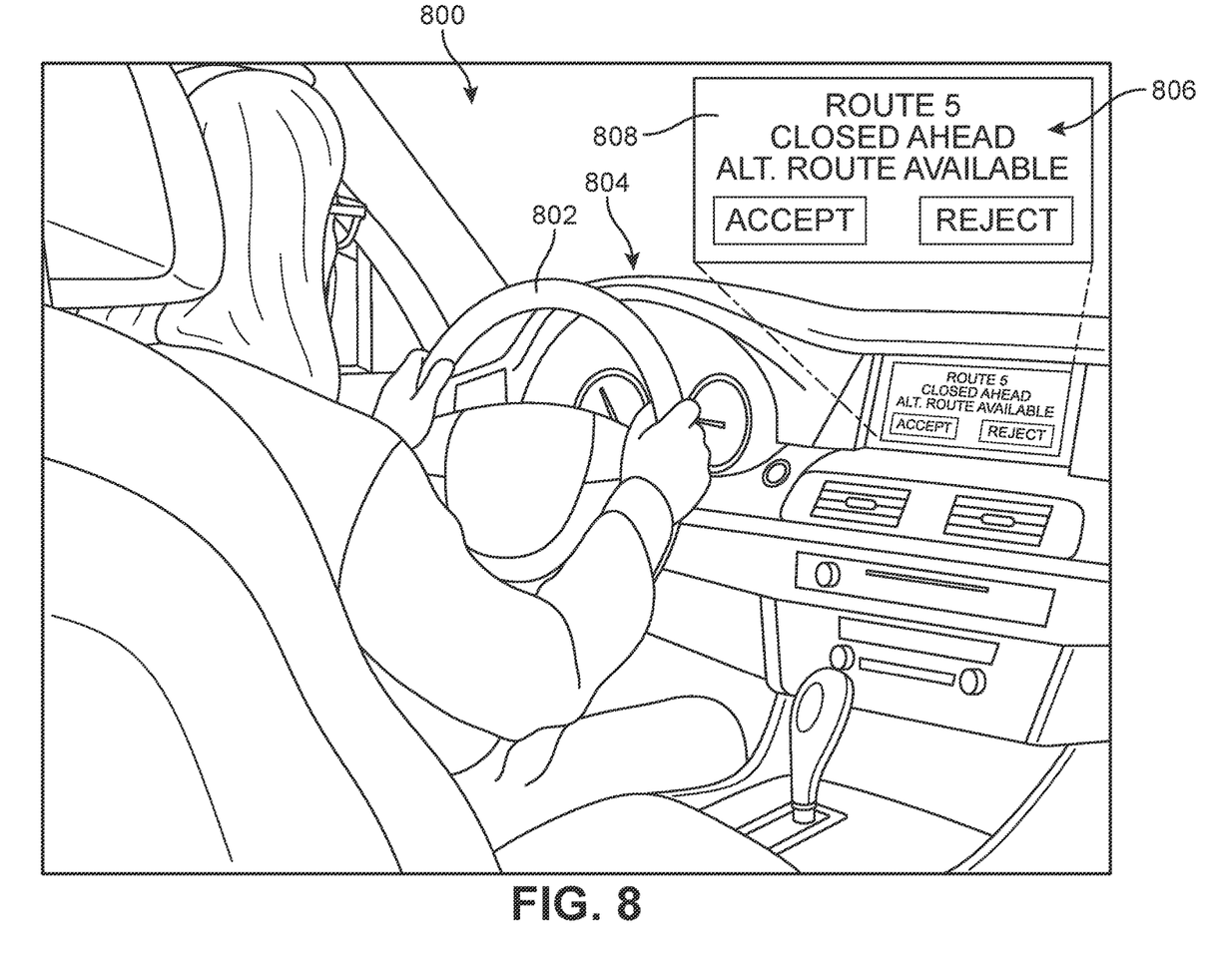
FIG. 8 is a schematic view of a vehicle dashboard and screen display presenting message about a road condition ahead, according to an embodiment.

Referring now to FIG. 8, an interior compartment 800 of a vehicle shows a dashboard of the vehicle with a steering wheel 802, an instrument console 804, and a flat screen display 806 connected to the vehicle's onboard computing system. In different embodiments, the display can show a GPS map, satellite radio controls, and other information to occupants of the vehicle. In one embodiment, the system is configured to transmit information 808 about an impaired road condition ahead (and, in some cases, to offer an alternate route) such that it is presented on the display 806. In the example of FIG. 8, the display 806 can indicate to a driver or passenger that Route 5 is closed ahead and notify them that an alternate route is available. The system can, in some embodiments, present options to the occupant(s) to accept the alternate route or reject it. If the vehicle driver or passenger accepts the alternate route, then the system will display the map showing the alternate route.

Figure 9:
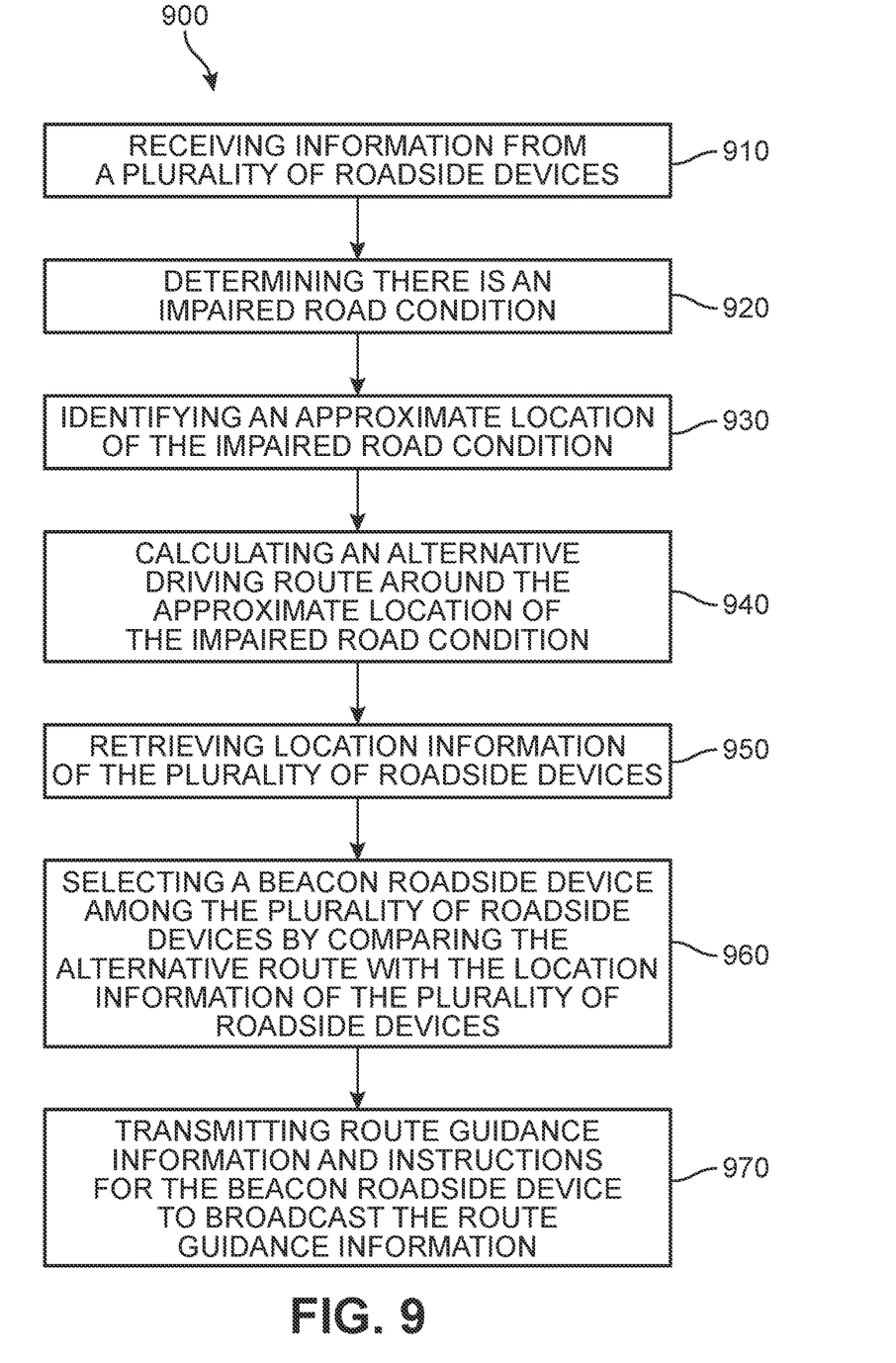
FIG. 9 is a flow chart depicting a process of distributing navigation information, according to an embodiment.

FIG. 9 is a flow chart illustrating an embodiment of a method 900 of distributing navigation information. A first step 910 includes receiving, at a server, information from a plurality of roadside devices, and a second step 920 includes determining, at the server, there is a high likelihood of an impaired road condition based on the information. A third step 930 includes identifying, at the server, an approximate location of the impaired road condition, and a fourth step 940 includes calculating, at the server and based on the approximate location of the impaired road condition, an alternative driving route around the approximate location of the impaired road condition. In addition, a fifth step 950 includes retrieving, at the server, location information of the plurality of roadside devices, and a sixth step 960 includes selecting, at the server, a beacon roadside device among the plurality of roadside devices by comparing the alternative route with the location information of the plurality of roadside devices. Finally, a seventh step 970 includes transmitting, from the server and to the beacon roadside device, route guidance information corresponding to the alternative route and instructions for the beacon roadside device to broadcast the route guidance information corresponding to the alternative route.

In other embodiments, the method may include additional steps or aspects. In one embodiment, the beacon roadside device is selected because its location is a predetermined distance upstream from the alternative route. In another embodiment, roadside devices disposed between the beacon roadside device and the alternative route are also sent the route guidance information corresponding to the alternative route along with instructions to broadcast the route guidance information corresponding to the alternative route.

In some embodiments, the method 900 also includes a step of retrieving, via the server, weather information for the approximate location from an external database, where the determination that there is a high likelihood of an impaired road condition is also based on the weather information. In one example, the transmission from the server to the beacon roadside device occurs via a data hub to which the beacon roadside device is connected. In addition, the method 900 can also include a step of transmitting, from the server to the beacon roadside device, instructions to display the route guidance information on a display of a vehicle passing by the beacon roadside device. Once a closed road section has been reopened, the server can be updated, and the roadside devices instructed to stop transmitting a closed road ahead alert and any alternate route.

Other methods can also be contemplated within the scope of this disclosure. For example, a computer-implemented method of distributing navigation information includes a first step of receiving, at a server, information from a plurality of roadside devices including a first roadside device, and a second step of determining, at the server, there is a high likelihood of an impaired road condition based on information received from the first roadside device. In such cases, the information received from the first roadside device includes vehicle information received from a first vehicle traveling near the first roadside device. The method also includes a third step of transmitting, from the server and to a second roadside device, route guidance information corresponding to a calculated alternative route, the second roadside device being different than the first roadside device and the second roadside device being spaced apart from the first roadside device, and a fourth step of transmitting, from the server and to the second roadside device, instructions to broadcast the route guidance information corresponding to the calculated alternative route.

In other embodiments, the method may include additional steps or aspects. In one embodiment, the vehicle information includes information related to a positive input from a driver of the first vehicle, and the positive input is a response to a message requesting information that the road is impaired. In another example, the vehicle information includes photographic information received from the first vehicle, and the photographic information includes at least one image showing an impaired road condition. In some embodiments, the photographic information received from the first vehicle includes a video clip received from a camera in the first vehicle. In another embodiment, the photographic information received from the first vehicle is analyzed by the server to determine there is a high likelihood of an impaired road condition being present. In some embodiments, the vehicle information includes navigation information received from the first vehicle, and the navigation information includes information related to the position and driving direction of the vehicle traveling near the first roadside device. In still another embodiment the navigation information includes information related to a change in driving direction of the first vehicle. In some cases, the navigation information includes information related to the change in driving direction of the first vehicle, and includes data about a U-turn by the first vehicle. Once a closed road section has been reopened, the server can be updated, and the roadside devices instructed to stop transmitting a closed road ahead alert and any alternate route.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for distributing navigation information comprising:
    receiving, at a server, information from a plurality of roadside devices;
    determining, at the server, there is a high likelihood of an impaired road condition based on the information;
    identifying, at the server, an approximate location of the impaired road condition;
    calculating, at the server and based on the approximate location of the impaired road condition, an alternative driving route around the approximate location of the impaired road condition;
    retrieving, at the server, location information of the plurality of roadside devices;
    selecting, at the server, a beacon roadside device among the plurality of roadside devices by comparing the alternative route with the location information of the plurality of roadside devices, and the beacon roadside device is selected because its location is a predetermined distance upstream from the alternative route; and
    transmitting, from the server and to the beacon roadside device, route guidance information corresponding to the alternative route and instructions for the beacon roadside device to broadcast the route guidance information corresponding to the alternative route.

2. The method according to claim 1, wherein the information includes at least one image showing the impaired road condition.

3. The method according to claim 1, wherein roadside devices disposed between the beacon roadside device and the alternative route are also sent the route guidance information corresponding to the alternative route along with instructions to broadcast the route guidance information corresponding to the alternative route.

4. The method of claim 1, further comprising retrieving, via the server, weather information for the approximate location from an external database, wherein the determination that there is a high likelihood of an impaired road condition is also based on the weather information.

5. The method of claim 1, wherein the transmission from the server to the beacon roadside device occurs via a data hub to which the beacon roadside device is connected.

6. The method of claim 1, further comprising transmitting, from the server to the beacon roadside device, instructions to display the route guidance information on a display of a vehicle passing by the beacon roadside device.

7. A method for distributing navigation information comprising:
    receiving, at a server, information from a plurality of roadside devices including a first roadside device;
    determining, at the server, there is a high likelihood of an impaired road condition based on information received from the first roadside device,
    wherein the information received from the first roadside device includes vehicle information received from a first vehicle traveling near the first roadside device;
    transmitting, from the server and to a second roadside device, route guidance information corresponding to a calculated alternative route, the second roadside device being selected because its location is a predetermined distance upstream from the calculated alternative route, wherein the second roadside device is spaced apart from the first roadside device; and
    transmitting, from the server and to the second roadside device, instructions to broadcast the route guidance information corresponding to the calculated alternative route.

8. The method according to claim 7, wherein:
    the vehicle information includes information related to a positive input from a driver of the first vehicle, and
    the positive input is a response to a message requesting information that the road is impaired.

9. The method according to claim 7, wherein:
    the vehicle information includes photographic information received from the first vehicle, and
    the photographic information includes at least one image showing an impaired road condition.

10. The method according to claim 9, wherein the photographic information received from the first vehicle includes a video clip received from a camera in the first vehicle.

11. The method according to claim 9, wherein the photographic information received from the first vehicle is analyzed by the server to determine there is a high likelihood of an impaired road condition being present.

12. The method according to claim 7, wherein:
    the vehicle information includes navigation information received from the first vehicle, and
    the navigation information includes information related to the position and driving direction of the vehicle traveling near the first roadside device.

13. The method according to claim 12, wherein the navigation information includes information related to a change in driving direction of the first vehicle.

14. The method according to claim 13, wherein the navigation information includes information related to the change in driving direction of the first vehicle, and includes data about a U-turn by the first vehicle.

15. A system for distributing navigation information, the system comprising a processor and machine-readable media including instructions which, when executed by the processor, cause the processor to:
 receive, at a server, information from a plurality of roadside devices;
 determine, at the server, there is a high likelihood of an impaired road condition based on the information;
 identify, at the server, an approximate location of the impaired road condition;
 calculate, at the server and based on the approximate location of the impaired road condition, an alternative driving route around the approximate location of the impaired road condition;
 retrieve, at the server, location information of the plurality of roadside devices;
 select, at the server, a beacon roadside device among the plurality of roadside devices by comparing the alternative route with the location information of the plurality of roadside devices, and the beacon roadside device is selected because its location is a predetermined distance upstream from the alternative route; and
 transmit, from the server and to the beacon roadside device, route guidance information corresponding to the alternative route and instructions for the beacon roadside device to broadcast the route guidance information corresponding to the alternative route.

16. The system of claim 15, wherein the information includes at least one image showing the impaired road condition.

17. The system of claim 15, wherein roadside devices disposed between the beacon roadside device and the alternative route are also sent the route guidance information corresponding to the alternative route along with instructions to broadcast the route guidance information corresponding to the alternative route.

18. The system of claim 15, wherein the instructions further cause the processor to retrieve, via the server, weather information for the approximate location from an external database, and wherein the determination that there is a high likelihood of an impaired road condition is also based on the weather information.

19. The system of claim 15, wherein the transmission from the server to the beacon roadside device occurs via a data hub to which the beacon roadside device is connected.

20. The system of claim 15, wherein the instructions further cause the processor to transmit, from the server to the beacon roadside device, instructions to display the route guidance information on a display of a vehicle passing by the beacon roadside device.

* * * * *